(12) United States Patent
Majmudar

(10) Patent No.: US 11,630,842 B2
(45) Date of Patent: *Apr. 18, 2023

(54) AUTOMATED PERFORMING OF REPLICATION TASKS IN A MULTIPLE DATABASE SYSTEM

(71) Applicant: SAP SE, Walldorf (DE)

(72) Inventor: Heshang Majmudar, Palo Alto, CA (US)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/723,078

(22) Filed: Apr. 18, 2022

(65) Prior Publication Data

US 2022/0318267 A1    Oct. 6, 2022

Related U.S. Application Data

(63) Continuation of application No. 16/548,031, filed on Aug. 22, 2019, now Pat. No. 11,308,120.

(51) Int. Cl.
*G06F 16/27* (2019.01)
*G06F 16/22* (2019.01)

(52) U.S. Cl.
CPC .......... *G06F 16/27* (2019.01); *G06F 16/221* (2019.01)

(58) Field of Classification Search
CPC .............................. G06F 16/27; G06F 16/221
USPC .......................................................... 707/634
See application file for complete search history.

(56) References Cited

U.S. PATENT DOCUMENTS

| 10,909,120 | B1* | 2/2021 | Mohamad | G06F 16/86 |
| 2015/0019488 | A1* | 1/2015 | Higginson | G06F 16/214 707/634 |
| 2016/0275159 | A1* | 9/2016 | Jarvie | G06F 16/1794 |
| 2020/0125566 | A1* | 4/2020 | Scott | G06F 16/24535 |

* cited by examiner

*Primary Examiner* — Robert W Beausoliel, Jr.
*Assistant Examiner* — Arthur Ganger
(74) *Attorney, Agent, or Firm* — Sterne, Kessler, Goldstein & Fox P.L.L.C.

(57) ABSTRACT

Disclosed herein are system, method, and computer program product embodiments for the performing of a replication task in a multi-database system, by a replication agent, for replicating a location range of columns in a table in a source repository data object, to a location range of columns in a target table in a target repository data object. An embodiment operates by using a data provisioning agent, remote source connection, and replication task controller in sequence to set up a replication task for execution.

20 Claims, 6 Drawing Sheets

AUTOMATED PERFORMING OF REPLICATION TASKS IN A MULTIPLE DATABASE SYSTEM

CROSS-REFERENCE TO RELATED APPLICATIONS

This is a continuation of U.S. Non-Provisional patent application Ser. No. 16/548,031, filed Aug. 22, 2019, the contents of which are incorporated herein by reference in their entirety.

BACKGROUND

As technology progresses with improvements in network/internet transfer speeds, increased bandwidth, storage technology, etc., an ever-increasing amount of information from businesses and individuals is stored in networked databases and storage mediums, such as central company repositories, cloud drives, virtual drop boxes, etc. The potential for data loss has come to be a critical factor affecting nearly all businesses in day-to-day operations. Especially for businesses, data is often stored in large data repositories. In such a case, with a concentrated amount of company information stored in one location, a loss of company data could prove catastrophic. For example, if valuable information relating to the business' product or know-how was suddenly lost or inaccessible, the result could be dire consequences all the way up to possible insolvency. Furthermore, such a loss of data would prove to be a competitive disadvantage, as at the very least, valuable time would be lost in re-constructing or re-gathering the lost data.

To prevent such a loss in data, a safe practice often followed by companies is to replicate their data across multiple repositories, where these multiple repositories may include multiple databases, warehoused at multiple physical locations. Additional use cases also exist, such as for a business enterprise, replicating data due to size constraints at one location to allow for customer data growth, and accordingly load-balancing data across a plurality of databases or repositories. Additional use-cases may also include replicating data to a different repository to ensure data preservation during temporary machine outages. However, in order to perform replication in all of these aforementioned scenarios, tools developed to perform said replication often involve several separate components. These separate components often each include different steps requiring manual intervention. For example, in the process of replicating data, manual intervention may be of the type asking a user a series of questions to assign configuration parameters for said replication, wherein the whole series of questions would need to be restarted each time the user only wants change one of the configuration parameters.

Because the scale of information stored in a database may range into the thousands of tables or even more, manual intervention required for replication may prove to be a very tedious task. For example, at this scale, if one were to manually select columns from a table in a source database for replication into selected columns of a target database, it is apparent that even one slight mistake out of a table with a large quantity of records may render the entire replication task useless.

Other complicating factors often include incompatibilities between types of databases for replication, which also require manual intervention and extra parameters needing to be specified since data formats are often not matching. Additional problems include a mismatch in the data structures of the databases requiring the user to specify additional information to mitigate such a mismatch. An example of this problem may include generated columns, where columns generated by the database by performing mathematical operations on other reference columns may not be able to be replicated or may require additional extra tedious steps needing to be taken by the user.

Still further problems include an inability to name certain objects within the database in a certain manner. For example, if the names of the table are automatically chosen by use of an automated algorithm, this may require a user seeking to avoid such naming to have to take additional tedious steps.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for performing a replication task from a source repository to a target repository, via a user module.

Figure 1:
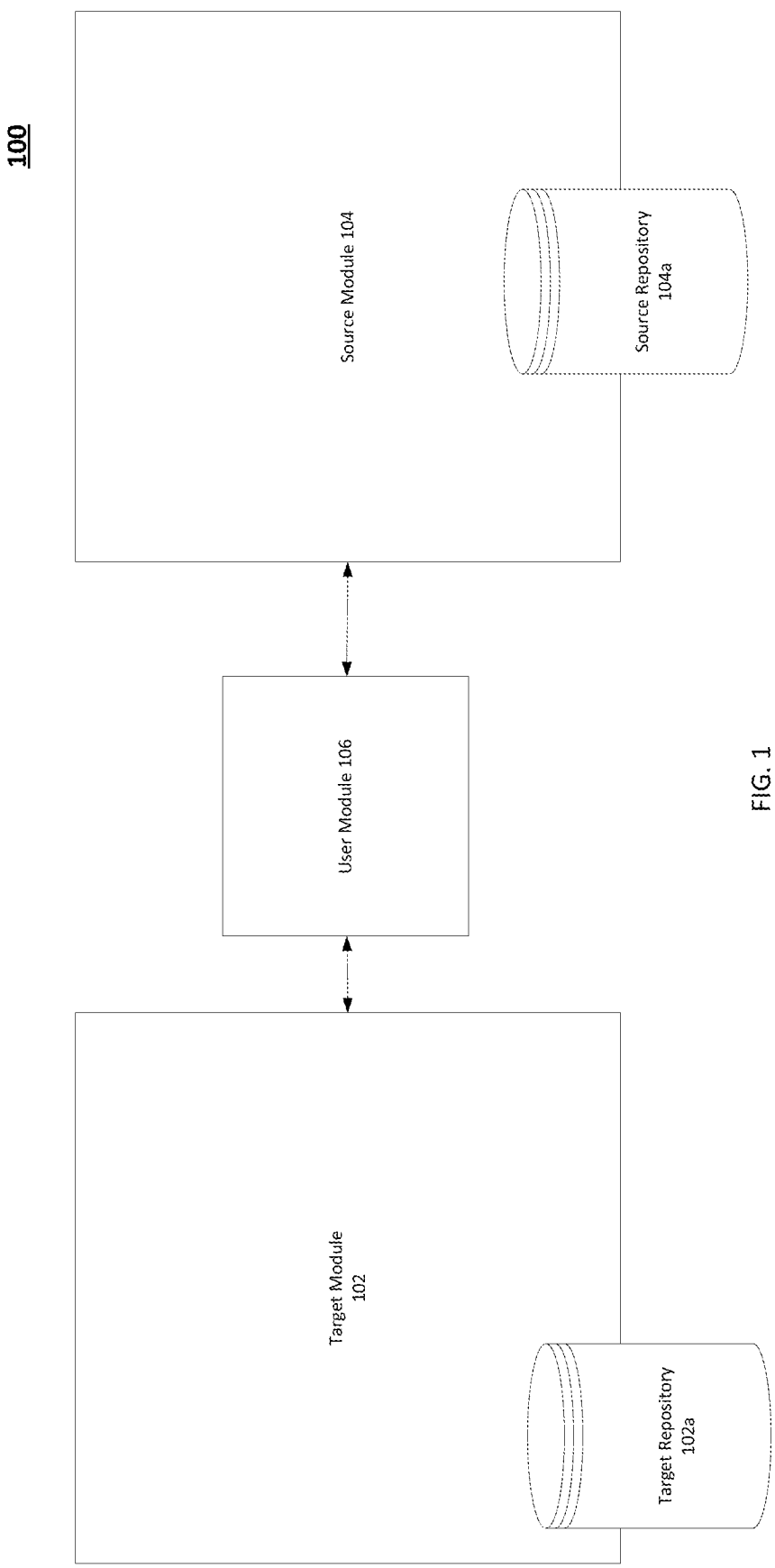
FIG. 1 is a block diagram of an example replication task system arrangement that includes a source module, source repository, user module, target repository, and target module, according to some embodiments.
Figure 2:
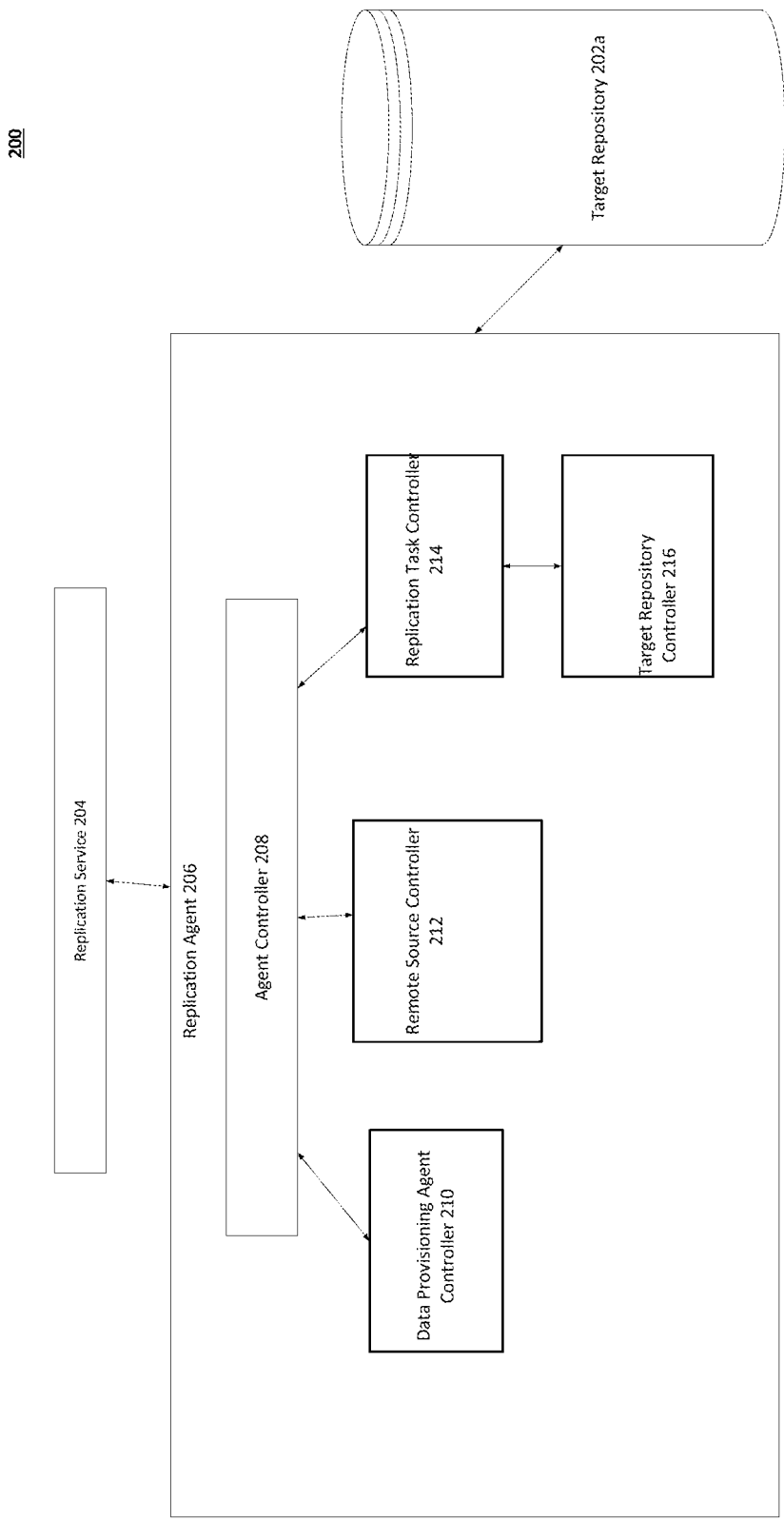
FIG. 2 is a block diagram showing the interaction of the replication agent with the target repository.

FIG. 1 is a block diagram illustrating the system arrangement for a sample replication task, according to an embodiment. In this embodiment, the target module 102, user module 106, and source module 104 may include computing systems 600 as shown in FIG. 6, which will be explained below. The target repository 102a, and the source repository 104a, may be present on the computing systems 600 of the target module 102 and the source module 104, respectively, or may comprise separate computing systems in themselves. An embodiment wherein the target repository 102a and the source repository 104a are part of the target module 102 and the source module 104, will be described hereafter. Further, the user module 106 may be integrated into the computing system 600 of the target module 102, or the computing system 600 of the source module 104. Any of the target module 102 or the user module 106 may contain a replication agent 206 as shown in FIG. 2, which is responsible for carrying out the method 300 of FIG. 3, and will be described below. Any of the target module 102, user module 106, or source module 104 may also be linked to a cloud computing environment 502 in FIG. 5, which will also be described herein.

FIG. 2 shows a block diagram 200 describing the interaction between a replication service 204 which is monitoring for user requests of replication tasks, and the replication agent 206. The replication service 204, and replication agent 206 and all of its internal modules as shown in FIG. 2, may be software modules, stored e.g., in the primary memory 608 or secondary memory 610 of a computer system 600 of the target module 102, or of a computer system 600 of the user module 106. Alternatively, the replication service 204, and the replication agent 206 and all of its internal modules may be stored in primary memory 608 or secondary memory 610 of computing resources 510 of a cloud environment 502 included as part of the target module 102, or stored in primary memory 608 or secondary memory 610 of computing resources 510 of a cloud environment 502 included as part of the user module 106. If the software modules are stored as part of the cloud resources 510 in either the target module 102 or user module 106, a web application 510a may be deployed giving a user an access to use the software modules, where said application may be able to be accessed from the other modules in FIG. 1 (e.g. if the web application 510a was deployed running software modules stored as part of the cloud resource 510 in the target module 102, then a user from the user module 106 would be able to access the software modules through the web application 510a).

Figure 3:
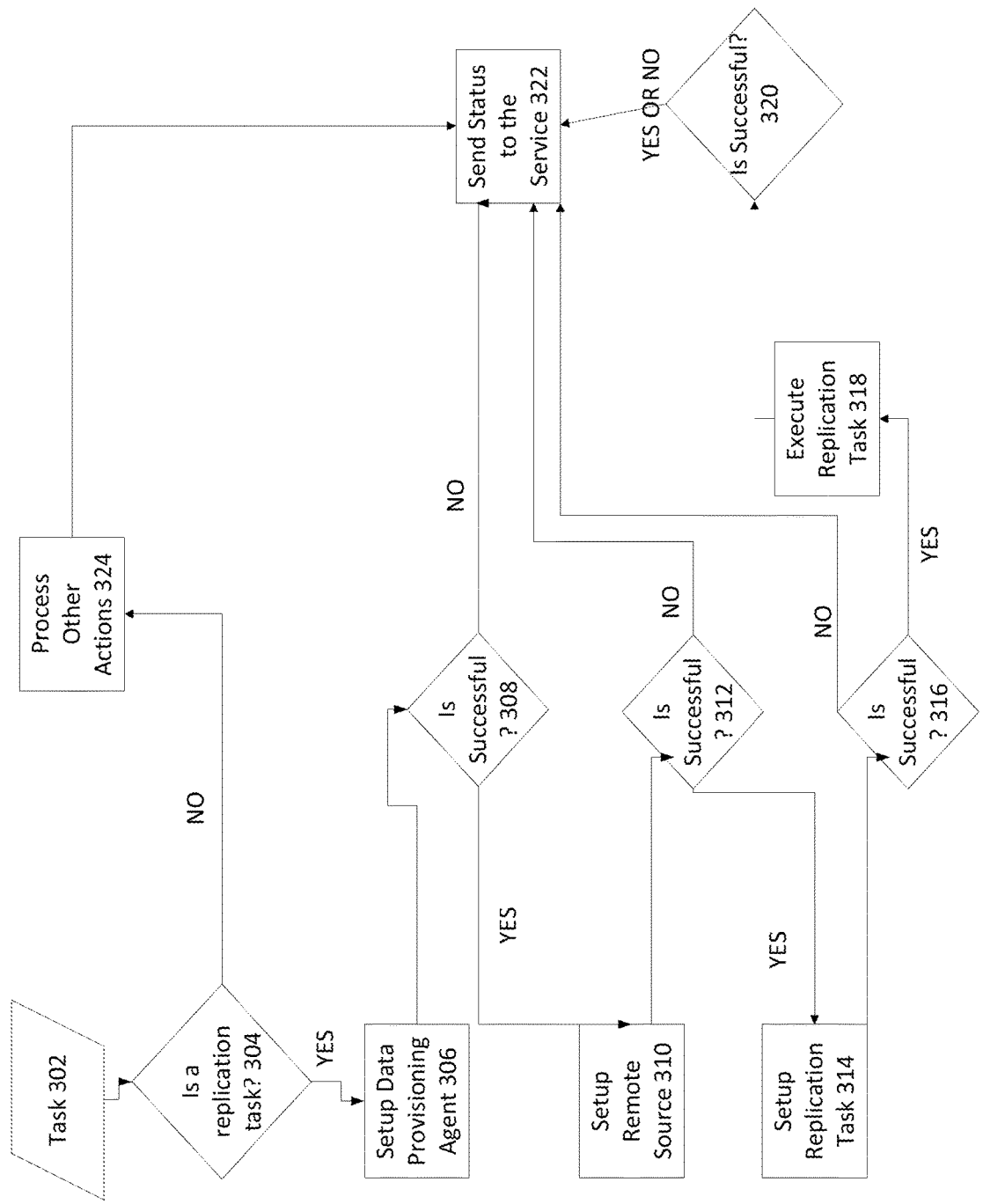
FIG. 3 is a flowchart illustrating a cascading sequence of actions taken by the replication agent, according to an embodiment.
Figure 4:
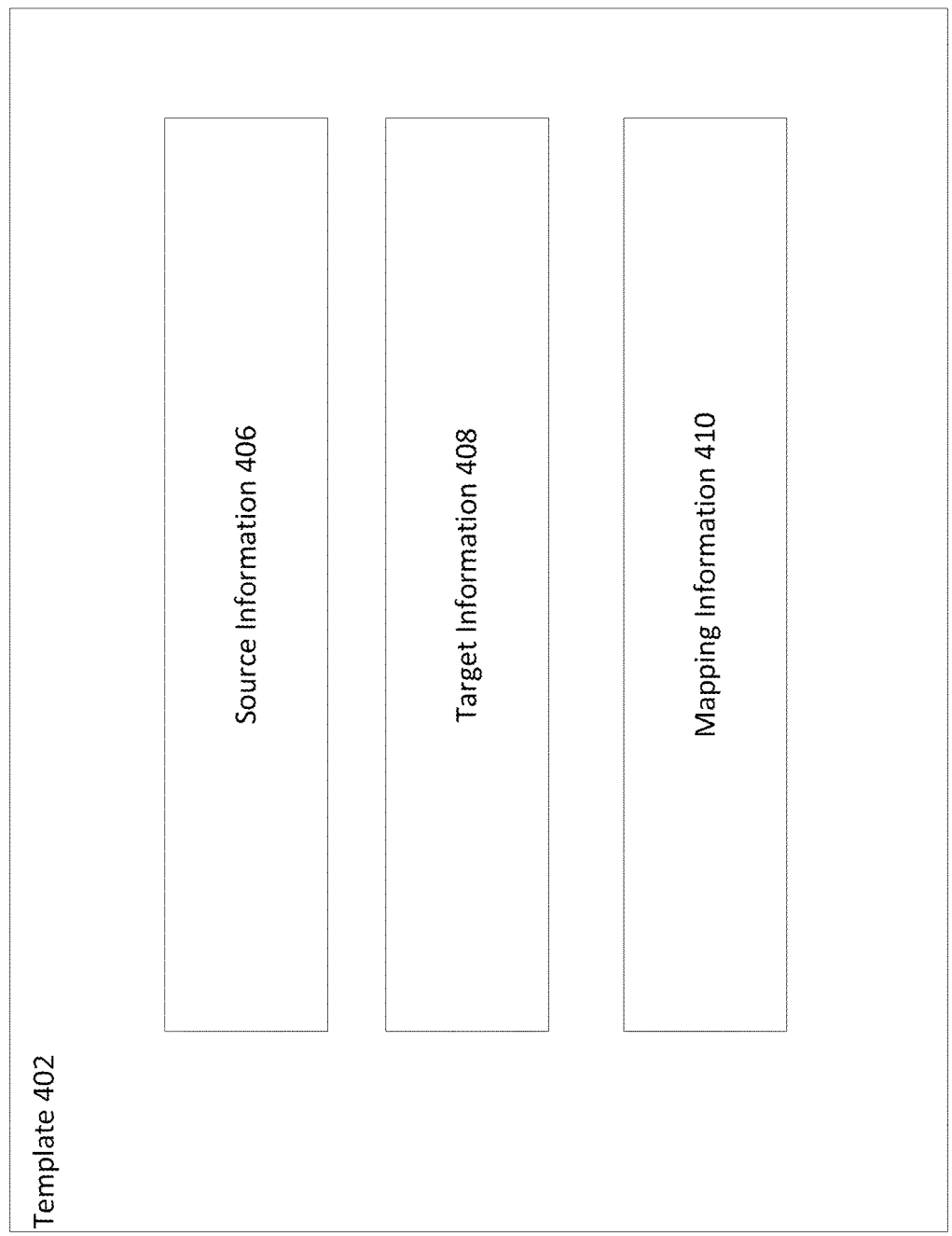
FIG. 4 is a block diagram of an example template used by the replication agent.

The actions of each of the elements of replication agent 206 combine to carry out the method 300 of the disclosed embodiments, as described herein. FIG. 3 shows a method 300, including the sequential flow of a process performed by the replication agent 206. The replication agent 206 performs an end-to-end automated process, given user-inputted parameters from a UI and/or uploaded file, of setting up a data provisioning agent, setting up a remote source, setting up a replication task, and executing the replication task. The method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2 and 4-6. However, method 300 is not limited to that example embodiment.

The method of FIG. 3 commences with the starting of the replication task 302. In 304, task 302 checks whether a new replication task is to be processed. Such checking may occur by the replication service 204 shown in FIG. 2. In this case, the replication service may be an event listener or handler listening on a web-based application 510a, which may be hosted in a cloud resource 510 of a cloud environment 502 included as part of user module 106. Alternatively, in an embodiment the web-based application 510a may be hosted in a cloud resource 510 of a cloud environment 502 included as part of target module 102. For example, in a web-based IDE for performing replication from a database in source repository 104a to a database in target repository 102a, after filling in necessary parameters, when the user clicks a button to perform the replication task, the replication service 204, through the listener/handler may receive these parameters, as a list of parameters (where a list of parameters contains one or more parameters), and in turn sends a start replication signaling command along with these received parameters to the replication agent 206. Such a replication may occur where the database in the source repository 104a may be of the same type as the database of the target repository 102a. Alternatively, in an embodiment, such a replication may occur where the database in the source repository 104a maybe of a different type than the database in the target repository 102a. The replication agent 206 may query the replication service 204, at predetermined (e.g. 0-100 milliseconds) or irregular intervals of time, to determine what tasks are needing to be performed. If there is a task needing to be performed, then any associated signals and parameters may be sent from the replication service 204 to the replication agent 206.

In the case of a replication task (signaling command and associated parameters) being sent from replication service 204 to replication agent 206, the signaling command received at the replication agent 206 from the replication service 204 may indicate YES at 304 in FIG. 3, for indicating a replicating task has been sent and to start replication. In 306, the replication agent may send a subset of these parameters to the data provisioning agent controller 210 from the agent controller 208, for setting up the data provisioning agent. Such parameters may include the target module port for which to run the data provisioning agent on, adapters needed by the data provisioning agent to access external databases, data provisioning agent name, data provisioning agent user credentials, target module, target repository user credentials, etc. in any combination. Alternatively, if upon querying the replication service 204, the replication agent 206 detects no such parameters received, or if the parameters are received via a signaling command from the replication service 204 for a task other than replication, this results in a NO at 304 in FIG. 3. In this case, other actions are processed in 324, and an unsuccessful status is sent to the replication service 204 in 322, whereby the process is terminated, and an error log is generated.

In order for performing the replication task, the replication agent 206 shown in FIG. 2 is used, wherein the replication service 204 is able to gather parameters from the UI of a web-based IDE, for example, and sets up and executes the replication task using the replication agent 206. When a user submits a request along with parameters from such a UI, by clicking a button on the UI or pressing a key, for example, through a background process the web-based IDE may send a replication request from the user module 106 to the replication service 204 using a replication service representational state transfer (REST) application protocol interface (API). Any known REST API response formats, such as JSON, PHP, etc., may be used by the background process.

Upon receipt of the signal to being replication at 304 by the replication agent 206, the process proceeds to 306 to start the end-to-end automated process of replication as will be explained below. Otherwise, as mentioned, if another signaling command is received to perform an action other than replication, the process proceeds as NO at 304 as described above.

As a further alternative, in an embodiment, the pre-inputted parameters may be supplied by the administrator of the target module 102 instead of the parameters being supplied by the user to the replication service 304 and onward to the replication agent 206, in which case the process may be an end-to-end replication process without any intervention, and may start directly from 306, wherein the file format or schema (e.g., JSON) housing the pre-inputted parameters may be in the primary memory 608 or secondary memory 610 of a computing system 600 or computing resource 510 of the user module 106, or of a computing system 600 or computing resource 510 of the target module 102. The file format or schema may in turn be read by the replication agent 206 and used by the various controllers under the replication agent shown in FIG. 2.

In 306, the data provisioning agent takes the parameters fed by the data provisioning agent controller 210, and is able to, through the parameters received from the replication service 204, access a target database in target repository 102a for setting up the data provisioning agent. First, in an initialization process, the data provisioning agent registers itself with the target module 102, and the database within the target repository 102a.

The data provisioning agent may have several adapter modules included as part of the agent for accessing databases of external types (not the same type as the target database) which may use known APIs, such as ORACLE, SQL Server, AWS, etc. Based on the adapter type input parameter given from the data provisioning agent controller, a particular adapter can be designated for use by the data provisioning agent in the replication task, to access a database in source repository 104a. Through such an adapter, the data provisioning agent can be used to set up the remote source, using the remote source controller 212, as will be explained below, for connecting and establishing a link to databases of external types in source repository 104a. Once the data provisioning agent is registered with the target module (e.g. it has logged into the target module port and can send and receive data from the target module 102 as well as a database in the repository 102a), these adapters are also registered with the target module 102 by the data provisioning agent. Through these adapters, when the source repository 104a is accessed via the remote source created by remote source controller 212, tables from data objects within databases of the source repositories 104a of different formats, and their associated metadata, can be copied, and obtained, such that they can be formatted by the adapters to conform to variable and table definition standards of the databases present in the target repository 102a. In an embodiment, only the adapter passed as a parameter from the data provisioning agent controller 210 may be registered with the target module 102.

After all of these tasks have been performed by the data provisioning agent, if no errors have been generated (YES at 308), the process then moves to 310 to set up remote source. However, if one or more errors is generated at any point during the carrying out of 306 by the process, then the setting up of the data provisioning agent is not deemed successful (NO at 308), and the process moves to step 322, and an unsuccessful status is sent to the replication service 204 in 322, whereby the process is terminated and an error log is generated.

At 310, the remote source controller 212 of the replication agent 206, using parameters passed to the replication agent 206 concerning the source module, and the adapters previously registered to the target module 102 by the data provisioning agent controller 210, is able to establish a connection with the source module 104, and is able to access a database in source module repository 104a. Such parameters may include source module name, source database name, log-in credentials, source module access port, etc. To establish the connection, the remote source controller may use database commands in the form of structured query language (SQL) server commands, or other forms of data commands compatible with the data structure of the target repository 102. Using database commands in this manner, along with the template 402 in the execution of the replication task 318 described below, the replication task controller 214 of the replication agent 206 can access the source repository 104a for metadata collection and create a replication task to be executed later. This task can copy data from a table or several tables to be replicated in a database in the source repository 104a. Through using the remote source controller 212 for accessing the source repository 104a in this manner, the replication task can format the data in a way that it will be compatible for insertion into a table within the database to be replicated into (which may be an existing or a new table in the database of the target repository 102a). After the remote source has been setup at 310, the process checks and makes sure there is a successful connection at 312, and if there is (YES at 312), then the process proceeds to setup the replication task at 314. However, if one or more errors is generated at any point during the carrying out of 310 by the process, then the setting up of the remote source 310 is not deemed successful (NO at 312), and the process moves to step 322, and an unsuccessful status is sent to the replication service 204 in 322, whereby the process is terminated and an error log is generated.

At 314, the replication task controller 214 of the replication agent 206 sets up the replication task. In particular, in the description that follows replication task controller 214 utilizing the aforementioned adapter set up by the data provisioning controller 210, collects metadata from the source repository 104a, loads the template 402, and uses certain received parameters from the replication agent 206 sent by replication service 204. First the replication task controller may collect the metadata from source repository 104a to populate source information 406 in the template 402. The source information 406 of the template file may describe the source repository to be accessed by the remote source, the remote source name, which represents the database in the source repository 104a to be replicated, the table or tables in the database to be replicated. Any of the source information 406, including the database in the source repository 104a to be replicated, as well as the table or tables in the database to be replicated can either be pre-set and pre-determined, or in an embodiment, can be chosen by the user from the aforementioned IDE, wherein the template generated by the REST API and passed to the replication agent 206 may already include this information 406 in part or in full. For missing sections of 406 (e.g. the remote source name, database in the source repository, and tables to be replicated may be specified as part of information 406) as well as for verification of each aspect of the information 406, replication task controller 214 may perform metadata collection as described.

Hereafter, each of the aforementioned aspects of the source information 406 may be referred to as source structure characteristics, referring to characteristics of the structure of the source repository 104a, and tables of a database within the source repository 104a, etc. In an embodiment, there may be multiple tables within the source database in the source repository 104a to be replicated, such that parameters for multiple replication tasks from within the same database in the source repository 104a can concomitantly be included in the source information 406 of a single template 402. For example, several different tables of customer records within a database in the source repository 104a may be passed as parameters or may be chosen in a pre-set manner for replication to a database in the target repository 102a. The metadata for said tables of customer records within the same database may be determined as described above, and this information may be populated as source information 406 in the template 402.

Next, through being pre-set, or through metadata collection, the replication task controller 214 populates similar data from a database of the target repository 102a into the template 402 under the target information 408 section in the form of the target repository name, the name of the table in the database of the target repository 102a to be replicated into (which may be automated, pre-set, passed by the user as a parameter received by the replication agent 206, or collected from the target repository 102a using the information received by replication agent 206), a data filter to be applied on data in the table in the database of the source repository 104a, to be replicated into target table. The target information 408 also includes the location range in the table in the database to be replicated in the form of target columns, and for each target column, any column modifiers (such as a column formula), the column scale, the column precision, and the column length. Hereafter, each of the aforementioned aspects of the target information 408 may be referred to as target structure characteristics, referring to characteristics of the structure of the target repository 102a, and tables of a database within the target repository 102a, etc. As described above with respect to replicating multiple tables within the database of the source repository 104a, in an embodiment, there may be multiple corresponding target tables within the target database in the target repository 102a specified in the target information 408 of the template concomitantly, for replication into several tables within the database of the target repository 102a. In a further embodiment if the columnar structure is the same between tables to be replicated within the database of the source repository 104a and a table within the target database in the target repository 102a, then replication from several source tables from the source repository 104a into a single table in the target repository 102a may be achieved by setting up multiple replication tasks by the replication task controller 214, each task appending onto the table in the target database row-by-row.

In a manner similar to the source information 406, any of the target information 408, including the database in the target repository 102a to be replicated into, as well as the table or tables in the target database to be replicated into can either be pre-set and pre-determined, or in an embodiment, can be chosen by the user from the aforementioned IDE, wherein the parameters passed from the replication service 204 to the replication agent 206 may include this data, and it may be populated in target information 408 via metadata collection. For missing sections of 408 as well as for verification of each aspect of the information 408, replication task controller 214 may perform metadata collection as described, wherein metadata collection includes reading passed parameters.

Finally, the replication task controller 214 may populate data into the template under the mapping information 410 based on the source information 406 and the target information 408 and metadata collection performed. In this section data in each column of the location range of the source table to be replicated from (in the embodiment where there is a single target table corresponding to a single source table) is mapped to each column of the location range of the target table to be replicated into. In other embodiments, where there may be e.g. a plurality of source tables and a single target table, which represents several sequential tasks (one for each source table and the corresponding target table) being arranged simultaneously, each column of the location ranges of several source tables to be replicated from, in a one-to-one column correspondence from source table to target table, may be mapped to a corresponding column of the location ranges of the target table to be replicated into. In contrast, for example, any one column of one target table may correspond to different columns of data from several source tables where the data is replicated from in an appended manner, onto the column of the target table, respectively, in accordance with the sequential order of the several sequential tasks, where said order within the column is also represented in the mapping information.

In any of the mentioned embodiments, when the replication task controller 214 populates such mappings, the replication task controller 214, through the remote source controller 212 as described above, can access metadata in the source table, and can check and detect columns in the source table which may be generated (e.g. the column may have modifiers that include arithmetic formulas setting the column data as the result of mathematical operations conducted on several other columns in the source table). In this case, if the column contains generated data, the replication task controller 214, when populating the mappings, does not process or populate any mappings for such a column. Instead, in this case, if the target table is defined with the same modifier formula as the source table, in target information 408, then when the replication task 318 is executed, the column can be generated according to the formula with the references to other columns in the target table. Further, in an embodiment, even if, by mistake, references to columns the source information 406 are included in modifier formulas in the target information 408, then the replication task controller 214, can simply check which columns these references are mapped to in the target information 408, and fix each respective reference in the modifier formulas, accordingly.

In this manner, several issues related to problems in copying data for generated columns from source tables to target tables can be avoided. Firstly, the problem that the data generated depends on references which refer to another table can be avoided by re-generating the column itself in the target table. Secondly, the process does not have to carry over references from one table to the next, and risk corrupting all tables with a single missing reference. Instead, the process can reassign the references each time a modifier formula is used in a new target table through utilizing the mappings, as described above.

Where parameters in the source information 406 or target information 408 are not present in the information sent by the REST API, as described above, the process may pursue a gap-filling algorithm, using metadata collection, and other parameters to replace information for the missing parameters wherever possible in 402. For example, when performing the task of replicating data from a table of a database in the source repository 104a to a corresponding table in a database in the target repository 102a, if the location range within the table to be replicated to is not specified in the template, then through the gap-filling process, first, the replication task controller 214 may utilize the connection established by the remote source controller 212 as described above to use the adapters registered by the data provisioning agent controller 210 to first access the database from which the table is being replicated from in the source repository 104a, and may determine any missing meta-data including the size, scale, precision, any modifiers, and number of columns of the table (if no target location range is specified previously in the template generated by the REST API).

Furthermore, if no table for replicating into is specified for the target database in the target repository 102a, then the replication task controller 214 may seek to set up target table parameters, including those mentioned above, for the creation of a new table within the database of the target repository 102a. The name of the table, for a new table within the target database to be created, may be automated, pre-set, or passed as a parameter received by replication agent 206, and utilized by replication task controller 214. Adhering to a desired name for the creation of a new table avoids the problem of automated naming of new tables not meeting user requirements. For example, where the table name may need to be a specific name in order to be used by a subsequent application, automated naming may not be able to meet this standard. As a result, this saves the user from having to select a location range within an existing table in the target repository 102a and manually map it to a location range to be replicated from in the source repository 104a, merely in order to preserve the naming convention of the existing table. Then, the replication task controller 214 may send a feedback signal to the target repository controller 216 along with the size and columns and any other missing metadata parameters, such that the target repository controller 216 can access the target repository 102a to, create a new table, in target repository 102a, with the same columnar structure as the source table to be replicated from, such that the entire desired location range from the table in the source repository 104a may be replicated. Then, the target repository controller 216 may designate such a location range within the table to be replicated into as the parameter for the location range within the table in the target repository 102a and may send a signal back to the replication task controller 214, with this missing information.

After all information has been populated into the template 402, and the replication task has been setup at 314, the process checks and makes sure there the setup is successful 316, and if it is (YES at 312), then the process proceeds to execute the replication task at 318. However, if one or more errors is generated at any point during the carrying out of 314 by the process, then the setting up of the replication task 314 is not deemed successful (NO at 316), and the process moves to step 322, and an unsuccessful status is sent to the replication service 204 in 322, whereby the process is terminated and an error log is generated.

As part of checking and making sure that the setup is successful in 316, a first check is performed to see if the columnar structure of the location range of the source table to be replicated from in the source repository 104a matches the columnar structure of the location range of the target table to be replicated into, in the target repository 102a. Such checking of structure includes columns, name, length, scale, precision, modifier formulas, and the like, to make sure both of them are the same before replication occurs. If such a check is fulfilled, then the generated task is thus pushed to the target module. When this occurs (in the embodiment with a single source table and a single target table), the replication task created by the replication task controller 214 is ready for execution.

Finally, in 318, the replication task may be executed. Once the replication task is generated by the replication task controller 214, using any parameters of the list of parameters received by 206 passed to the replication task controller, the template 402 and the gathered metadata as described above, a workspace is generated within primary or secondary memory (as will be described below) of the target module 102 for execution. The generated task that has been pushed to the target module is processed by the CPU of the target module 102, or as an application 510a as part of a computing resource 510 on a cloud computing environment 502, which will be described below. After the check of 316 is complete, and the created replication task has been pushed to the target module, utilizing the template 402 and in particular the mapping information 410 within the template 402, replication tasks are executed by the target module 102 in a sequential manner, table-by-table. In an embodiment, target module 102 may, for each replication task, use the connection established by the remote source controller 212 to pull data from the designated source table to be replicated from in the specified columns of the location range, and replicate this data into the designated target table of the designated database of the target repository 102a in the specified columns of the location range to be replicated into, respectively. Further, after data is replicated into the target table of the target repository 102a based on the mapping information 410, based on any modifiers such as formula's, etc., columns to be generated in the target table may be generated based on e.g., arithmetic operations performed on the already-replicated columns from the mapping information 410.

Finally, after such tasks have been performed then the process proceeds to step 320, wherein the task is deemed successful (YES at 320), and a successful completion status is sent to the replication service 204, whereby the process is terminated. However, if one or more errors is generated at any point during the carrying out of 318 by the process, then the execution is not deemed successful (NO at 320), and the process moves to step 322, and an unsuccessful status is sent to the replication service 204 in 322, whereby the process is terminated and an error log is generated.

Further to the above, several additional embodiments are to be contemplated or considered. Where data from several source tables may be input to be replicated into several target tables, the data provisioning agent controller 210 may be used during the execution of task 218 to split the task into several sub-tasks, and allocate the processing of the data pulled from the source repository 104a, and subsequent replication by the replication task controller 214 and the target repository controller 216, in a sequential or parallel manner with respect to the sub-tasks. For example, where there are many large columns to be replicated from a source table in a single location range, using metrics such as length, size, value distribution, etc. the data provisioning agent controller 210 may group the processing of several of said columns into several different clusters, and allocate one of said clusters to one GPU, and others of said clusters to another GPU, etc. In this way load-balancing can occur when performing the execution of the replication task 318, in order to most efficiently use resources available.

To aid in the understanding of method 300 as applied to FIGS. 1-2 and 4-6 the underlying structure of a computing system 600 of FIG. 6 and the environment 500 of FIG. 5, of an interaction of such a computing system 600 with a cloud computing environment 502, will be described hereafter.

The underlying structure of a computer system 600, shown in FIG. 6, can implement a database included in the source repository 104a or the target repository 102a, and the sending and receiving of data. Such a computer system 600, may, according to the embodiments describe above, be included as part of any combination of the target module 102, target module repository 102a, user module 106, source module 104, and/or source repository 104a (e.g. a singular computer system 600 may be included jointly by the user module 106, target module 102, and target repository 102a, or each module/repository could include a separate computer system 600). Computer system 600 may include one or more processors (also called central processing units, or CPUs), such as a processor 604. Processor 604 may be connected to a communication infrastructure or bus 606.

Computer system 600 may be virtualized, or it may also include user input/output devices 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process table data received from the source module repository 104*a* for replication to the target repository 102*a* when data is to be processed in a mass quantity, making it particularly effective in resource-intensive applications. As described above, the data provisioning agent controller may be used for resource partitioning among GPU's 604 of several computing systems 600, or of several computing resources 510 of the cloud computing environment 502 of FIG. 5 including computing systems 600. The GPU may have a parallel structure that is efficient for parallel processing of large blocks of data, such as mathematically intensive data common to computer graphics applications, images, videos, word-processing documents, PDF files, and the like, any of which can include table data received from source module repository 101*a* as described above.

Computer system 600 can also include a main or primary memory 608, such as random-access memory (RAM). Main memory 608 can include one or more levels of cache (including secondary cache).

Computer system 600 can also include one or more secondary storage devices or memory 610. Secondary memory 610 may include, for example, a hard disk drive 612 and/or a removable storage device or drive 614, which may interact with a Raid array 616, which may combine multiple physical hard disk drive components (such as SSD or SATA-based disk drives) into one or more logical units, or a removable storage unit 618. Removable storage unit 618 may include a computer usable or readable storage device having stored thereon computer software (control logic) and/or data, including remotely accessed network drives. Removable storage unit 618 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote entities 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the source module 104, the source repository 104*a*, the user module 106, the target module 102, and the target repository 102*a* and the central module 102 in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Computer system 600 may be a client or server, accessing or hosting any applications and/or data through any delivery paradigm, including but not limited to remote or distributed cloud computing solutions such as cloud computing environment 502 which will be explained below; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the source repository 104*a*, as an example approach, for storing and accessing its constituent data objects, the computer system 600 may use an in-memory database with persistence, which may store and access data objects from the primary memory 608 of the computer system 600 with a transaction log for persistence being stored in secondary memory 610. Alternately, the computer system 600 may use secondary memory 610 entirely to store the repository, or may implement a more frequently accessed portion of the data objects in an in the primary memory 608, and a less frequently accessed portion of the data objects in secondary memory 610.

If the source repository 104a or target repository 102a is implemented as a separate system 600, it may send data through the communication or network interface 624, wherein the source module 104, user module 106, and target module 102 may comprise entities 628 present on an internal or external network, which may be accessed through communications path 626. Alternately, if the source module 104 is present along with source module repository 104a jointly in a computer system 600, then the computer system 600 may implement the database using the communication infrastructure 606 for communication between source repository 104a and the source module 104, but may send data to the user module 106 and target module 102 through the communications interface 624, through communications path 626, where central module 102 is a network entity 628. An analogous mode of operation may apply if the user module 106, target module 102, and target repository 102a are all jointly present in a computer system 600, for using the communication infrastructure 606 for communication between the user module 106, target module 102, and repository 102a, but the communications interface 623 for sending data to external network entities 628.

Figure 5:
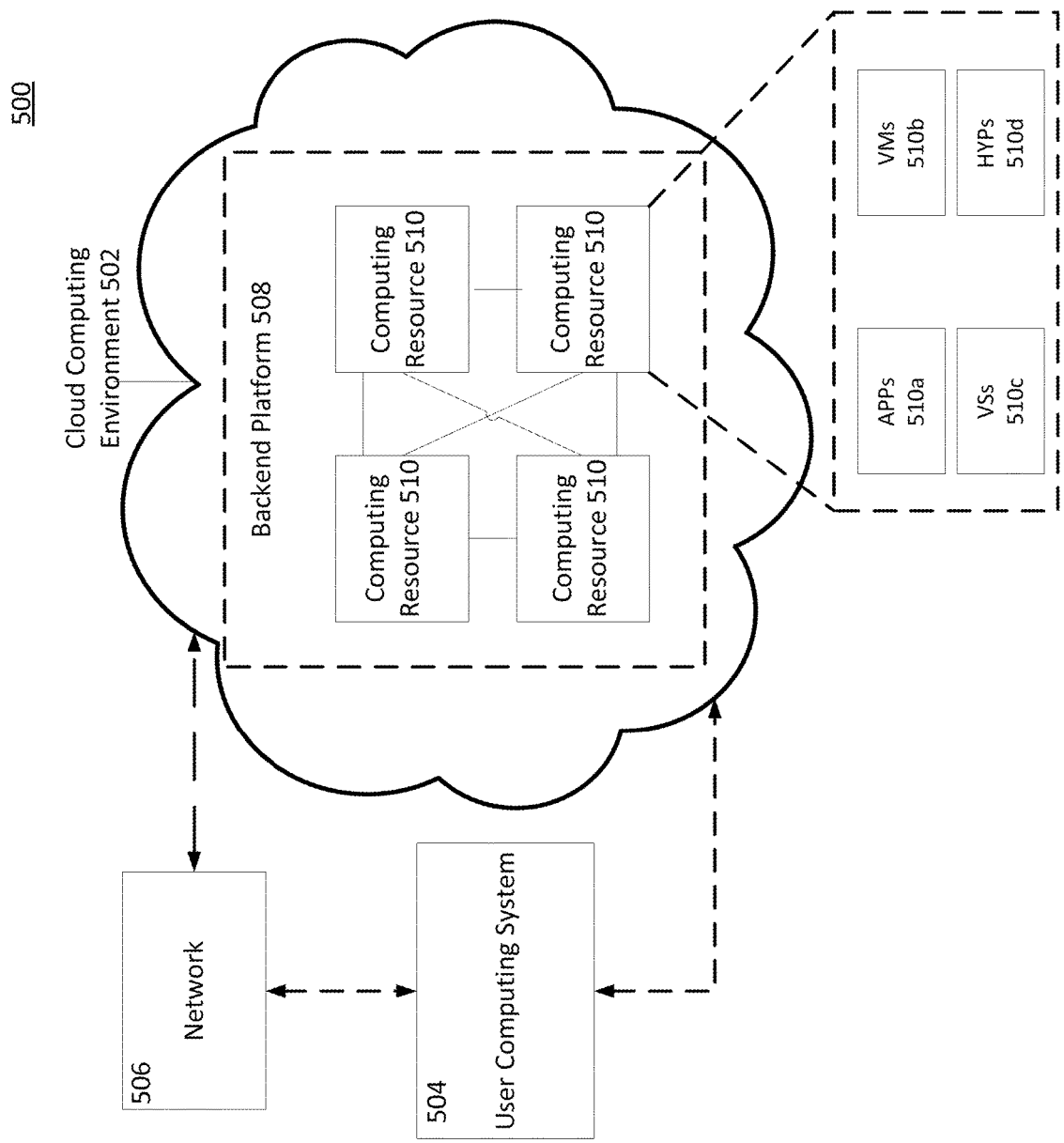
FIG. 5 is a block diagram of an example where a cloud computing environment may be accessed by a user module, according to an embodiment.
Figure 6:
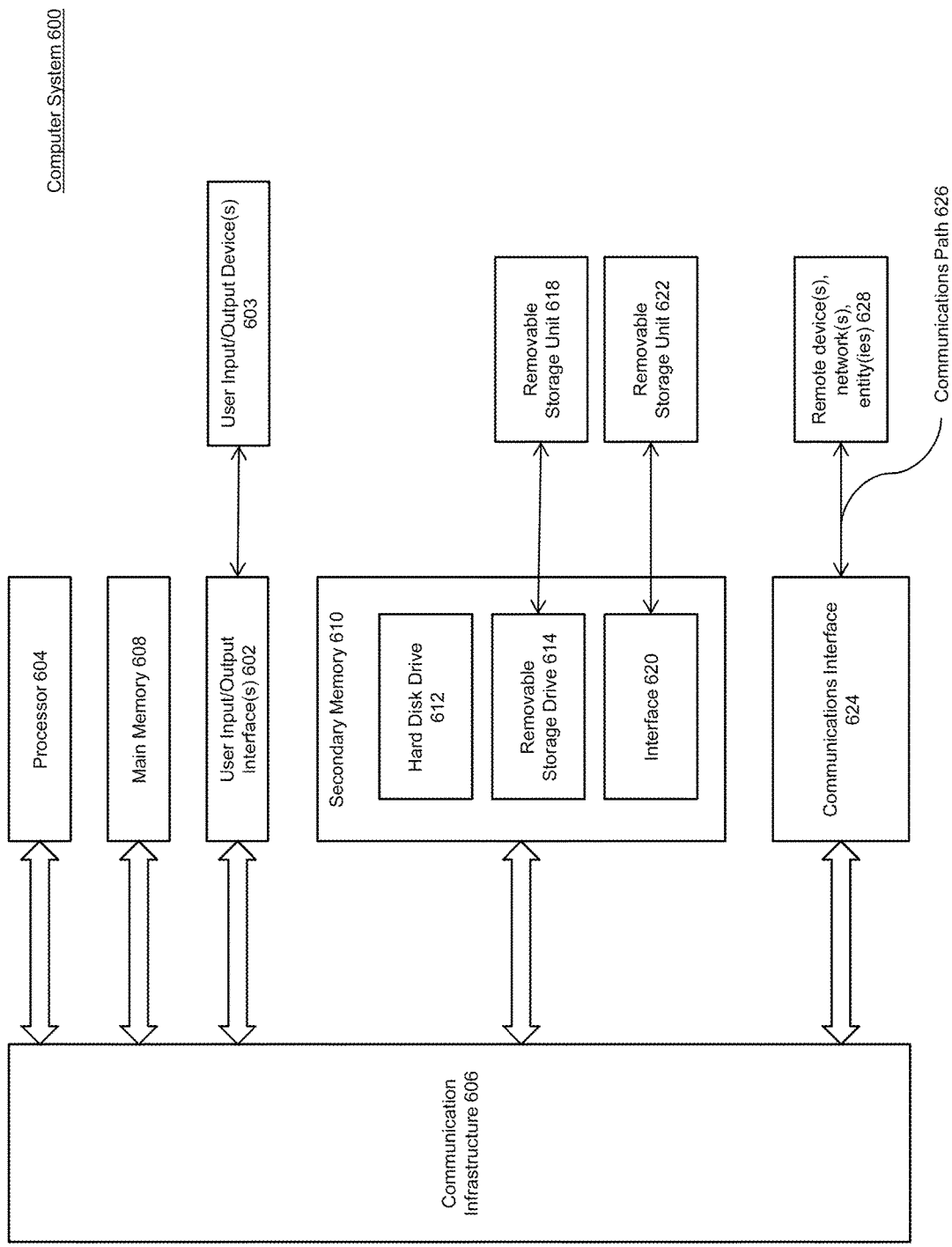
FIG. 6 is an example computer system useful for implementing various embodiments.

As shown in FIG. 5, cloud computing environment 502 may contain backend platform 508, in a block diagram of an example cloud environment 500 in which systems and/or methods described herein may be implemented. The user module 106 of FIG. 1, described above, may also include a host such as cloud computing environment 502 in an embodiment. The cloud computing environment 502 may be accessed by the user module computing system 504, of the same type of computing system 600 as described above. In this case, the user computing system 504 of FIG. 5 may access the cloud computing environment 502 by a communication or network interface 624 as shown in FIG. 6, wherein a network gateway 506 may comprise a remote entity 628 accessed by the communications path 626 of the central module computing system (where the three entities 502, 504, and 506 shown in FIG. 9 would correspond to the user module 106 of FIG. 1). Alternately, the computing cloud environment 502 itself may correspond to a remote entity 628 in FIG. 6, and may be accessed directly by the user computing system 504 through a communications path 626, for example through an application protocol interface (API), eliminating the need for a network gateway 506 (both options are shown in FIG. 9, wherein the flow path above the central module computing system 504 uses a network gateway 506, and the flow path below the user computing system 504 connects directly to the cloud computing environment 502, both shown using dashed bi-directional lines). In an analogous manner to the user module 106, in addition to or as an alternative to user module 106, any of the target module 102 and source module 104, or both, may also include a host such as a cloud computing environment 502 in an embodiment. In such an embodiment, the cloud computing environment 502 of the target module 102 or source module 104 may be accessed by a target computing system 504 or a source computing system 504 (both of the type of computing system 600), respectively, instead of the user computing system 504 in FIG. 5, wherein where there may be multiple cloud environments 500 present in the system of FIG. 1.

The devices of the environments 500 and 100 may be connected through wired connections, wireless connections, or a combination of wired and wireless connections. In an example embodiment, one or more portions of the data transfer environment 100 or example cloud environment 500 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the user module 106 of FIG. 1 may have a central module computing system 504 as shown in FIG. 5 comprising a computer system of the same type as the computer system 600 as shown in FIG. 6. The source module 104, source repository 104a, target module 102, or target repository 102a may access the user module 106 through the user computing system 504, wherein the source module 104, source repository 104a, target module 102, and target repository 102a may be external network entities 628 from the perspective of the user computing system 504 in an embodiment, and may send data back and forth in the form of data packets through the communications path 626 of the communications interface 624 of system 504, using e.g., TCP/IP/UDP/FTP/HTTPS/HTML5 protocol. Alternately, the source module 104, source repository 104a, target module 102, or target repository 102a may access the user module 106 through a front-end application 510a (e.g. a web browser application, a web integrated development platform (IDE), a web browser extension, proprietary OS application, standalone executable application, command line access shell program, FTP/UDP/TCP/HTML5 protocol, etc.) hosted as an application 510a on a computing resource 510 (explained below) within the cloud computing environment 502 hosted by the user module 106, in an embodiment.

The backend platform 508 in FIG. 5 may include a server or a group of servers. In an embodiment, the backend platform 508 may host a cloud computing environment 502. It may be appreciated that the backend platform 508 may not be cloud-based, or may be partially cloud-based.

The cloud computing environment 502 includes an environment that delivers computing as a service and software as a service ("CaaS" and "SaaS" as described above), whereby shared resources, services, etc. may be provided to the user computing system 504 and/or the backend platform 508. The cloud computing environment 502 may provide computation, software, data access, storage, and/or other services that do not require end-user knowledge of a physical location and configuration of a system and/or a device that delivers the services. For example, through a cloud environment 500 included as part of the source module 104, the user module 106 may receive data stored within or hosted on a database within computing resources 510 within the backend platform 508 for the source module 104, through an application protocol interface (API) or any of the various communication protocols previously listed, or through a web-based application 510a, which will be described below.

The cloud computing environment 502 may include computing resources 510. Each computing resource 510 includes one or more personal computers, workstations, computers, server devices, or other types of computation and/or communication devices of the type such as computer system 600 described above. The computing resource(s) 510 may host the backend platform 508. The cloud computing resources may include compute instances executing in the cloud computing resources 510. The cloud computing resources 510 may communicate with other cloud computing resources 510 via wired connections, wireless connections, or a combination of wired or wireless connections.

Computing resources 510 may include a group of cloud resources, such as one or more applications ("APPs") 510a, one or more virtual machines ("VMs") 510b, virtualized storage ("VS") 510c, and one or more hypervisors ("HYPs") 510d.

An application 510a may include one or more software applications that may be provided to or accessed by a computer system 600, such as web-based applications, web-based IDEs, etc. In an embodiment, the user module 106 may include a cloud computing environment 502 executing locally on a computer system 600 of the user computing system 504. The application 510a may include software associated with backend platform 508 and/or any other software configured to be provided across the cloud computing environment 502 (e.g. to source module 104 or target module 102). The application 510a may send/receive information from one or more other applications 510a, via one or more of the virtual machines 510b. Computing resources 510 may be able to access each other's applications 510a through virtual machines 510b, in this manner. In an alternate embodiment, a separate user computing system 504 is not needed, and the user module 106 only comprises the cloud computing environment 502, hosted and executed by computing resources 510, and communicating with the source module 104 or target module 102 via app 510a, using any of the various communication protocols mentioned above. Analogous logic applies to cloud environments 500 of the source module 104 as well as of the target module 102.

Virtual machine 510b may include a software implementation of a machine (e.g., a computer) that executes programs like a physical machine. This may be of particular use in the alternate embodiment where there is no separate user computing system 504 of the type of computer system 600. In this embodiment, the user computing system 504 may be a virtualized machine 510b, and may communicate with source module 104 or target module 102 using the various communication protocols listed above, via an application 510a. Virtual machine 510b may be either a system virtual machine or a process virtual machine. A system virtual machine may provide a complete system platform that supports execution of a complete operating system (OS). A process virtual machine may execute a single program and may support a single process. The virtual machine 510b may execute on behalf of a user (e.g., the administrator of the user module 106) and/or on behalf of one or more other backend platforms 508, and may manage infrastructure of cloud computing environment 502, such as data management, synchronization, or long duration data transfers, and accessing the source repository 104a of a source module 104, or the target repository 102a of a target module 102.

Virtualized storage 510c may include one or more storage systems and/or one or more devices that use virtualization techniques within the storage systems or devices of computing resource 510. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the user module 106, source module 104, or target module 102 flexibility in how they manage storage for data from processing of data accessed from the source repository 104a or target repository 102a. File virtualization may eliminate dependencies between data accessed at a file level and location where files are physically stored. This manner of block and file virtualization may enable optimization of storage use, server consolidation, and/or performance of non-disruptive file migrations.

Hypervisor 510d may provide hardware virtualization techniques that allow multiple operations systems (e.g., "guest operating systems") to execute concurrently on a host computer, such as computing resource 510, which may include a computing system of the type of computing system 600, and can in this manner host a virtualized hardware of a user computing system 504. Hypervisor 510d may present a virtual operating platform to the guest operating systems, and may manage multiple instances of a variety of operating systems as these "guest operating systems," which may share virtualized hardware resource, such as RAM, which may for instance access the data in the form of a database of the source repository (104a in FIG. 1) or target repository (102a in FIG. 1). Alternately, secondary memory may be accessed using virtualized storage 510c, or on physical storage, such as the hard disk drive 612, of a computing resource 510 of the type of computing system as computing system 600. In embodiments heretofore described, using a combination of RAM and secondary memory to access the database, such that a portion of the database may be in-memory and a portion of the database stored in files It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for generating and performing a replication task, comprising:
receiving, by at least one processor, a signal to start generating the replication task and a list of parameters;
configuring, by the at least one processor and responsive to the signal, the replication task to at least partially replicate a source data table from an external database in a source repository to a target data table of a data object in a target repository, based on the list of parameters and a generated template, the generated template comprising a source structure corresponding to the source repository, a target structure corresponding to the target repository, and mapping information;
determining, by the at least one processor, a first column of source columns in the source repository and a second column of target columns in the target repository share a same modifier formula; and
executing, by the at least one processor, the replication task.

2. The method of claim 1, wherein data is populated in the second column based on the modifier formula and references to one or more different target columns in the target repository.

3. The method of claim 1, wherein after the signal and the list of parameters are received, the configuring the replication task and the executing the replication task are performed by the at least one processor in a fully automated manner based on the parameters from the list of parameters and the generated template.

4. The method of claim 1, wherein the replication task, based on the configuring the replication task, is based on the generated template,
wherein the source structure includes a source structure characteristic;
wherein the target structure includes a target structure characteristic; and
wherein the mapping information includes the source columns within a location range in the source data table to be replicated from corresponding to the target columns within a location range in the target data table to be replicated into.

5. The method of claim 1, wherein the replication task is based on the generated template comprising the mapping information including the source columns within a location range in the source data table to be replicated from in the source repository corresponding to the target columns within a location range in the target data table to be replicated into in the target repository, wherein configuring the replication task comprises:
checking, by the at least one processor, that a new modifier formula of the target structure includes source data table column references not found in the target data table; and
replacing, by the at least one processor responsive to the checking, the source data table column references in the new modifier formula with corresponding column references in the target data table obtained through the mapping information describing source data table columns mapped to target data table columns.

6. The method of claim 1, wherein the replication task is based on the generated template comprising the mapping information including the source columns within a location range in the source data table to be replicated from in the source repository corresponding to the target columns within a location range in the target data table to be replicated into in the target repository, wherein configuring the replication task comprises:
accessing, by the at least one processor, metadata in the source repository through a remote source connection; and
processing, by the at least one processor, the mapping information for all columns.

7. The method of claim 1, wherein the replication task is based on the generated template comprising the mapping information including the source columns within a location range in the source data table to be replicated from in the source repository corresponding to the target columns within a location range in the target data table to be replicated into in the target repository, wherein configuring the replication task comprises:
determining, by the at least one processor, if a columnar structure is the same between several tables to be replicated within the external database and a single table to be replicated into a target database in the target repository; and
if the columnar structure is the same, simultaneously mapping, by the at least one processor, several sub-replication tasks, each task for replication from one of the several tables of the external database to the single table in the target repository, such that the several sub-replication tasks are set-up to be appended onto the target data table in the target database in a row-by-row manner.

8. A system for generating and performing a replication task, comprising:
a memory; and
at least one processor coupled to the memory and configured to perform operations comprising:
receiving a signal to start generating the replication task and a list of parameters;
configuring, responsive to the signal, the replication task to at least partially replicate a source data table from an external database in a source repository to a target data table of a data object in a target repository, based on the list of parameters and a generated template, the generated template comprising a source structure corresponding to the source repository, a target structure corresponding to the target repository, and mapping information;
determining a first column of source columns in the source repository and a second column of target columns in the target repository share a same modifier formula; and
executing the replication task.

9. The system of claim 8, wherein data is populated in the second column based on the modifier formula and references to one or more different target columns in the target repository.

10. The system of claim 8, wherein after the signal and the list of parameters are received, the configuring the replication task and the executing the replication task are performed in a fully automated manner based on the parameters from the list of parameters and the generated template.

11. The system of claim 8, wherein the replication task, based on the configuring the replication task, is based on the generated template,
wherein the source structure includes a source structure characteristic;
wherein the target structure includes a target structure characteristic; and
wherein the mapping information includes the source columns within a location range in the source data table to be replicated from corresponding to the target columns within a location range in the target data table to be replicated into.

12. The system of claim 8, wherein the replication task is based on the generated template comprising the mapping information including the source columns within a location range in the source data table to be replicated from in the source repository corresponding to the target columns within a location range in the target data table to be replicated into in the target repository, and wherein to configure the replication task, the at least one processor is further configured to:
check that a new modifier formula of the target structure includes source data table column references not found in the target data table; and
replace, responsive to the checking, the source data table column references in the new modifier formula with corresponding column references in the target data table obtained through the mapping information describing source data table columns mapped to target data table columns.

13. The system of claim 8, wherein the replication task is based on the generated template comprising the mapping information including the source columns within a location range in the source data table to be replicated from in the source repository corresponding to the target columns within a location range in the target data table to be replicated into in the target repository, wherein to configure the replication task, the at least one processor is further configured to:
access metadata in the source repository through a remote source connection; and
process the mapping information for all columns.

14. The system of claim 8, wherein the replication task is based on the generated template comprising the mapping information including the source columns within a location range in the source data table to be replicated from in the source repository corresponding to the target columns within a location range in the target data table to be replicated into in the target repository, and wherein to configure the replication task, the at least one processor is further configured to:
determine if a columnar structure is the same between several tables to be replicated within the external database and a single table to be replicated into within a target database in the target repository; and
if the columnar structure is the same, simultaneously map several sub-replication tasks, each task for replication from one of the several tables of the external database to the single table in the target repository, such that the several sub-replication tasks are set-up to be appended onto the target data table in the target database in a row-by-row manner.

15. A non-transitory computer-readable medium for generating and performing a replication task, having instructions stored thereon that, when executed by at least one computing device, cause the at least one computing device to perform operations comprising:
receiving a signal to start generating the replication task and a list of parameters;
configuring, responsive to the signal, the replication task to at least partially replicate a source data table from an external database in a source repository to a target data table of a data object in a target repository, based on the list of parameters and a generated template, the generated template comprising a source structure corresponding to the source repository, a target structure corresponding to the target repository, and mapping information;
determining a first column of source columns in the source repository and a second column of target columns in the target repository share a same modifier formula; and
executing the replication task.

16. The non-transitory computer-readable medium of claim 15, wherein data is populated in the second column based on the modifier formula and references to one or more different target columns in the target repository.

17. The non-transitory computer-readable medium of claim 15, wherein after the signal and the list of parameters are received, the configuring the replication task and the executing the replication task are performed in a fully automated manner based on the parameters from the list of parameters and the generated template.

18. The non-transitory computer-readable medium of claim 15, wherein the replication task, based on the configuring the replication task, is based on the generated template,
wherein the source structure includes a source structure characteristic;
wherein the target structure includes a target structure characteristic; and
wherein the mapping information includes the source columns within a location range in the source data table to be replicated from corresponding to the target columns within a location range in the target data table to be replicated into.

19. The non-transitory computer-readable medium of claim 15, wherein the replication task is based on the generated template comprising the mapping information including the source columns within a location range in the source data table to be replicated from in the source repository corresponding to the target columns within a location range in the target data table to be replicated into in the target repository, wherein the configuring the replication task further comprises:
checking that a new modifier formula of the target structure includes source data table column references not found in the target data table; and
replacing, responsive to the checking, the source data table column references in the new modifier formula with corresponding column references in the target data table obtained through the mapping information describing source data table columns mapped to target data table columns.

20. The non-transitory computer-readable medium of claim 15, wherein the replication task is based on the generated template comprising the mapping information including the source columns within a location range in the source data table to be replicated from in the source repository corresponding to the target columns within a location range in the target data table to be replicated into in the target repository, wherein the configuring the replication task further comprises:
  accessing metadata in the source repository through a remote source connection; and
  processing the mapping information for all columns.

* * * * *